United States Patent [19]
Miller et al.

[11] 3,930,808
[45] Jan. 6, 1976

[54] AUTOMATIC COLLET HINGE/SCREW PLACEMENT MACHINE

[75] Inventors: Leslie R. Miller, Phoenix, Ariz.; John D. McKenney, South Laguna, Calif.

[73] Assignee: Royal Industries, Inc., Pasadena, Calif.

[22] Filed: Feb. 7, 1975

[21] Appl. No.: 547,891

Related U.S. Application Data

[62] Division of Ser. No. 403,747, Oct. 5, 1973, Pat. No. 3,889,343.

[52] U.S. Cl. ........... 29/200 P; 29/200 R; 29/208 R; 29/211 R; 29/240; 144/32
[51] Int. Cl.² ........................................ B23P 19/00
[58] Field of Search .......... 29/200 A, 200 R, 200 P, 29/211 R, 208 R, 240, 400 D; 144/32

[56] References Cited
UNITED STATES PATENTS

3,466,730  9/1969  McHenry et al. ................ 29/407 X
3,537,166  11/1970  Matyas .............................. 29/200 P
3,675,297  7/1972  Appleton ....................... 29/200 P X
3,772,757  11/1973  Goldstein ......................... 144/32 X

*Primary Examiner*—Victor A. DiPalma
*Attorney, Agent, or Firm*—Lynn G. Foster

[57] ABSTRACT

An automatic collet hinge/screw placement machine comprising a reservoir for bulk storage of screws, a vibrator segregating the screws into a plurality of magazines and an escapement mechanism for dispensing a set of screws essentially concurrently in time, the machine further comprising a table upon which the work, e.g., a cabinet door, is placed between stop structure for correctly locating the work. A hinge-holding/-screw-placing head containing a collet for each screw of the set is mounted upon a reciprocating frame whereby the head is pneumatically lowered to position a hinge and a set of screws for placement following which the screws are inserted into the work through apertures in the hinge using a driver mechanism comprised of universal joints for each screw.

14 Claims, 17 Drawing Figures

AUTOMATIC COLLET HINGE/SCREW PLACEMENT MACHINE

CONTINUITY

This application is a division of our copending U.S. patent application Ser. No. 403,747, filed Oct. 5, 1973, now U.S. Pat. No. 3,889,343, issued June 17, 1975.

BACKGROUND

1. Field of invention

The present invention relates generally to the placement of screws in work and more particularly to an automatic collet hinge-holding screw-placing machine.

2. Prior Art

Typically, hinge placement on doors has been achieved manually, using a power driven, hand held screw driver. This procedure has been time consuming, exepensive and often inaccurate.

BRIEF SUMMARY AND OBJECTS OF THE INVENTION

In summary, the present invention provides apparatus and methods for automatically dispensing a set of screws from bulk storage, holding the set of screws in desired orientation above a pre-positioned workpiece at a screw placement site, insuring that the screws and workpiece are juxtaposed and simultaneously driving the screws from their holders into the workpiece through hinge apertures.

With the foregoing in mind, it is a paramount object of the present invention to provide apparatus and methods for automatically installing screw-secured hinges on workpieces.

These and other objects and features of the present invention will be apparent from the following detailed description, taken with reference to the accompanying drawings.

BRIEF DESCRIPTION OF THE DRAWINGS

FIG. 1. illustrates a crank/cam mechanism for lifting and lowering the table to facilitate proper location of the workpiece in respect to the head;

DETAILED DESCRIPTION OF THE ILLUSTRATED EMBODIMENT

Figure 1:
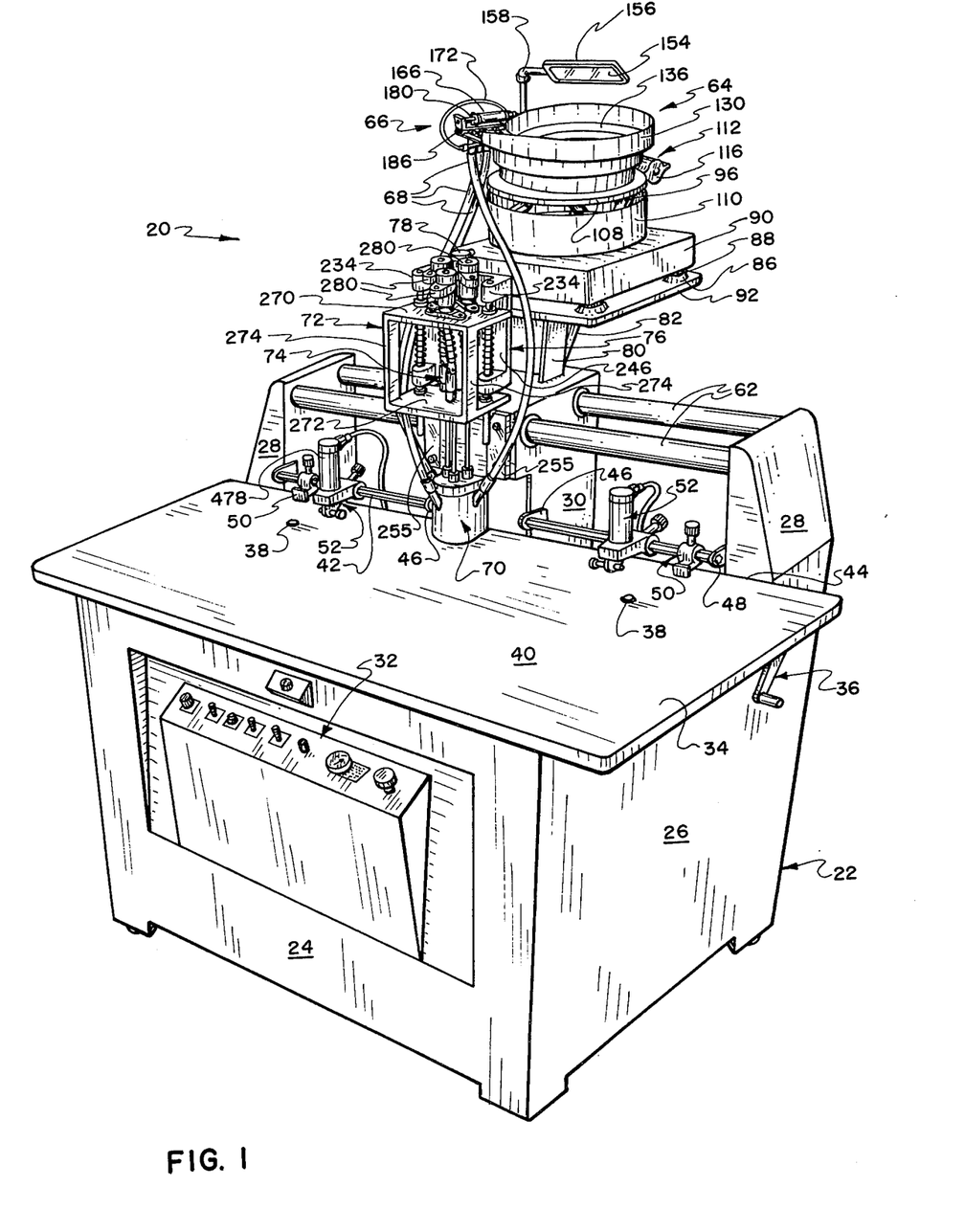
FIG. 1 is an isometric view of one presently preferred embodiment according to the present invention.

Reference is now made to the Figures wherein like numerals are used to designate like parts throughout. FIG. 1 shows in isometric perspective a presently preferred embodiment of this invention consisting of an automatic collet hinge-holding screw-placing machine, generally designated 20. Machine 20 comprises a frame 22 comprising a front wall 24, side walls 26, a back wall (not shown), side abutments 28 and central support 30. A control panel, generally designated 32 is located at the front wall 24. A work-receiving table 34, which is placed in either an up or a down position by a crank mechanism 36 bridges between side panels 26 and extends beyond the side panels, the back panel and the front panel 24. A pair of button switches 38 are exposed at the upper surface 40 of the table 34 and are actuated by the work in a manner and for purposes hereinafter mentioned. A pair of hexagonal rods 42 extend in a common plane above the table 34 adjacent the back edge 44 thereof. Each hexagonal rod 42 is mounted by a lug 46 to the central support 30 and by a like lug 48 to one of the outside abutments 28. A door edge orienting stop mechanism 50 is slidably disposed upon each hexagonal rod 42 in non-rotatable fashion. Also, a pneumatic actuated door end orienting stop structure 52 is slidably and non-rotatably carried upon each of the hexagonal rods 42.

The central support 30 carries a safety switch 460 which must be actuated before the machine is operable and which also serves as a door edge orienting stop structure.

The upper portion of the central support 30 is held against horizontal and vertical movement by and may be located slidably along a pair of horizontal shafts 62 bridging between and anchored at each end to the abutments 28.

The central support 30 carries a vibrating screw dispenser 64. The vibrating screw dispenser 64 stores screws for the machine 20 in bulk, segregates them into sets of screws, loads the sets into a magazine and dispenses each set using an escapement mechanism 66. In the illustrated embodiment each set of screws consist of three screws which pass along hollow tubes 68 (preferably comprised of polyflow tubing) after being released by the escapement mechanism 66 to a hinge-holding screw-placing head 70. It is to be appreciated that more than one head 70 can be provided where it is desired to screw secure more than one hinge to a workpiece concurrently. The head is suspended from a reciprocating frame 72 which also carries three screw driver mechanisms 74. Reciprocation of the frame 72 is accommodated by a fixed frame 76 against which the reciprocating frame 72 moves up and down. The fixed frame 76 also carries a two-way pneumatic cylinder 78 by which the reciprocating frame 72 is displaced. The reciprocating frame 72 has three fluid motors mounted at its top plate by which the three screw driver mechanisms are actuated.

Having generally described the mechanism 20, a more specific description ensues.

Figure 2:
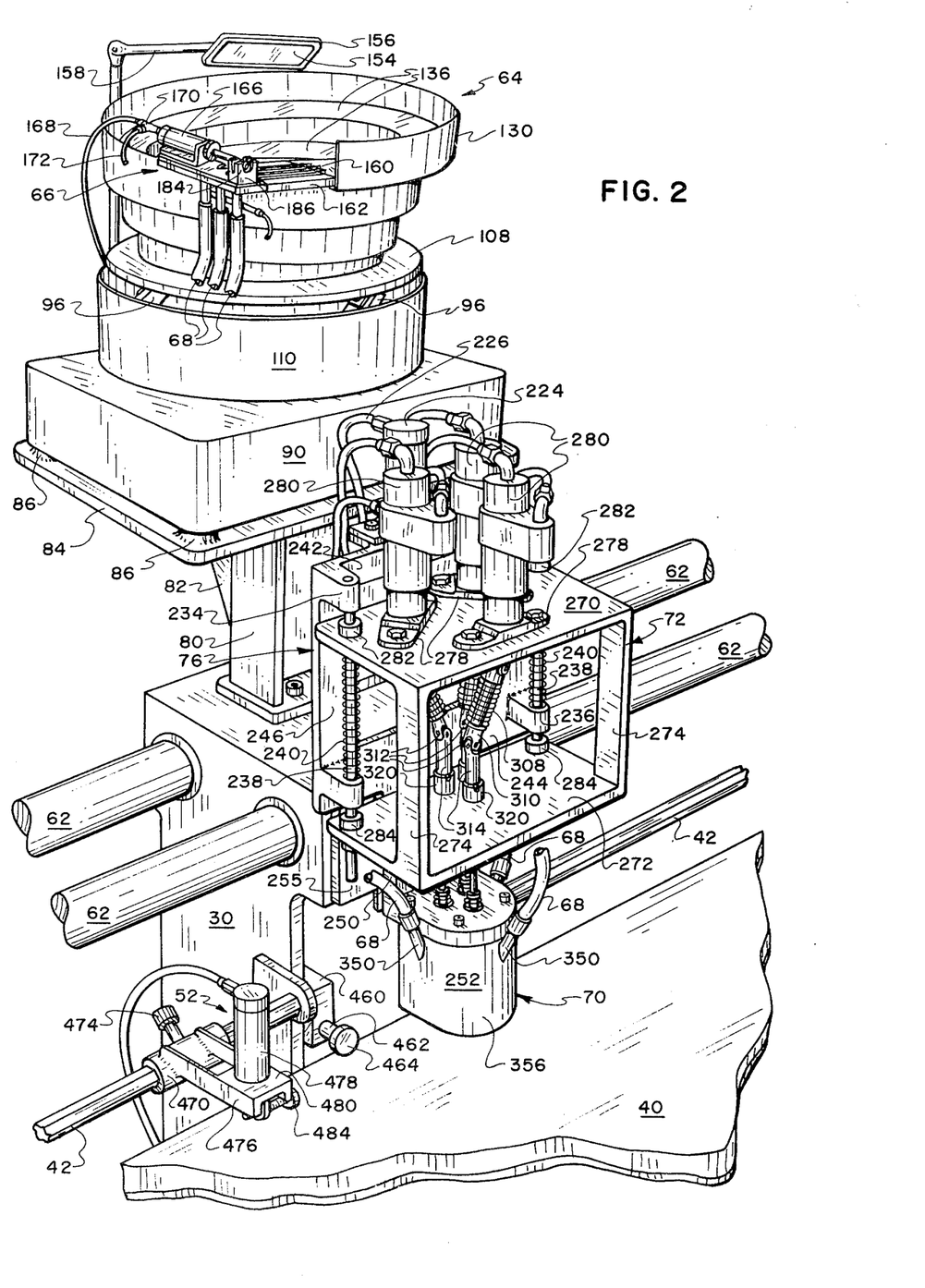
FIG. 2 is a fragmentary and enlarged perspective representation of the vibrating screw dispenser, the screw-placing head and screw driver mechanisms together with the mechanisms for reciprocating the head and rotating the driver mechanisms and workpiece stop structures for correctly orienting the workpiece respecting the head.
Figure 3:
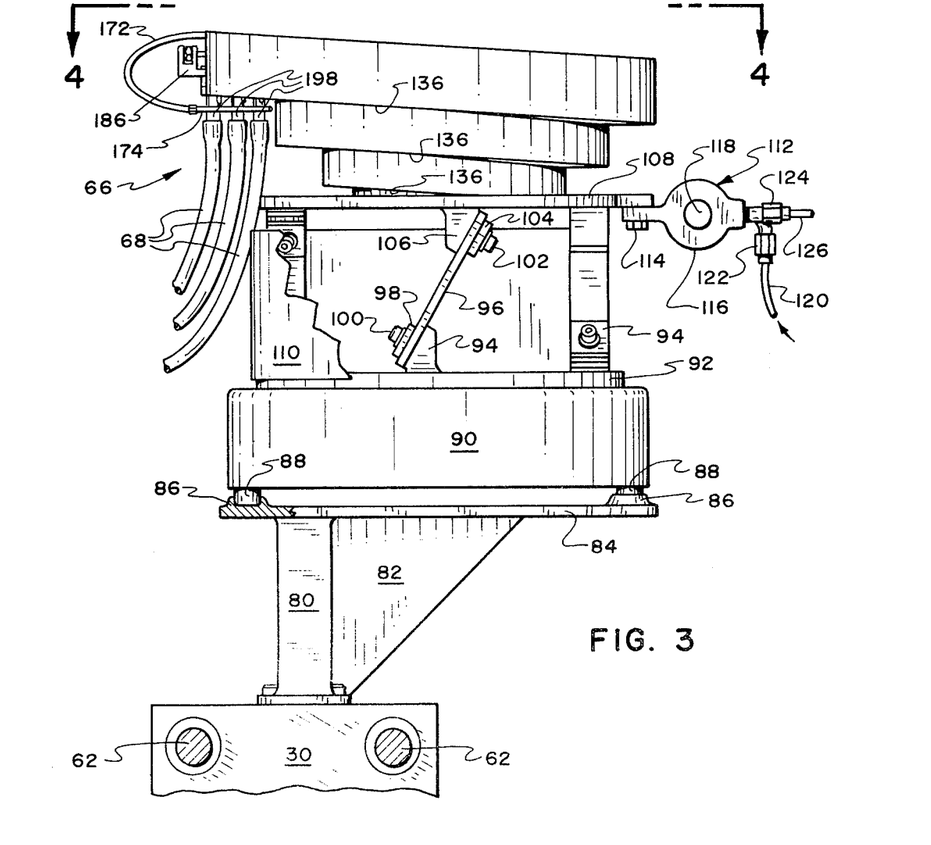
FIG. 3 is an enlarged fragmentary side elevation with parts broken away for clarity of the screw vibrating dispenser of FIG. 1.
Figure 4:
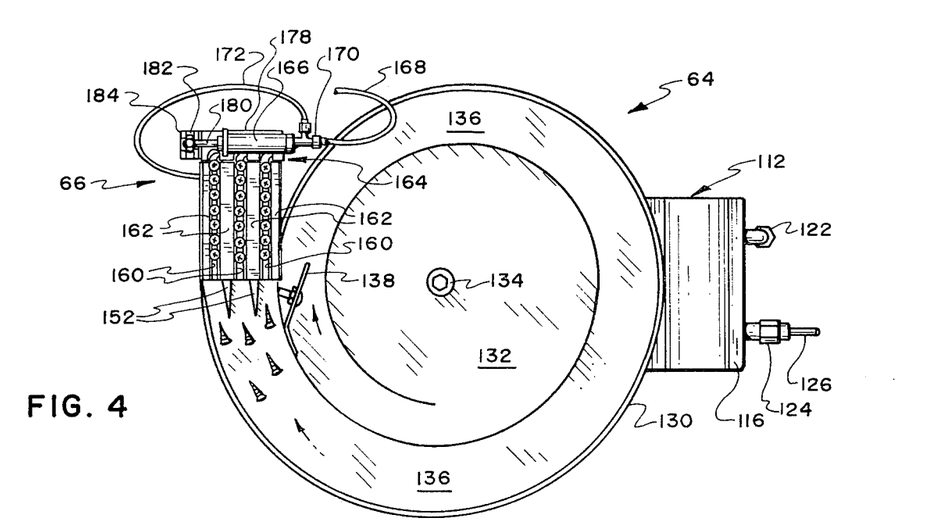
FIG. 4 is a plan view taken along lines 4—4 of FIG. 3.
Figure 5A:
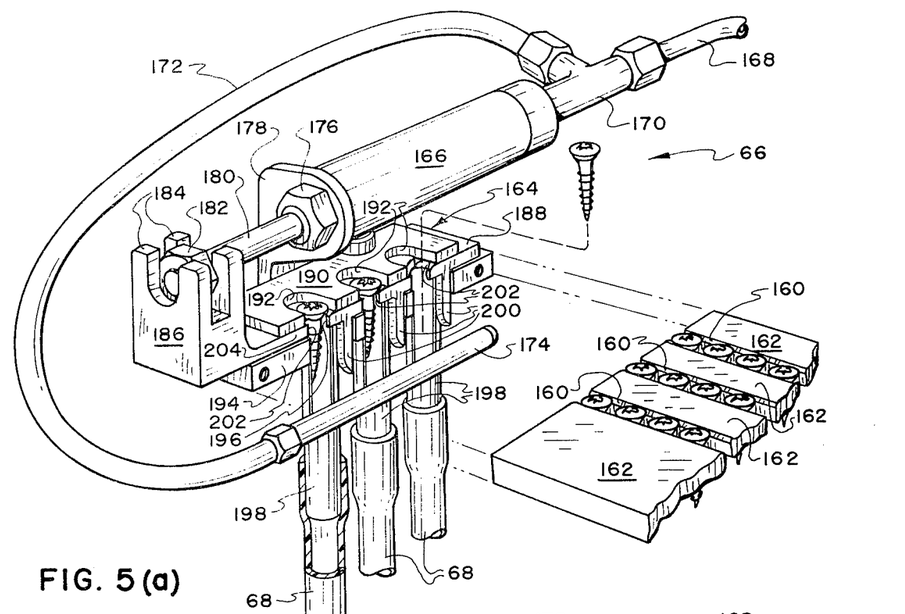
FIGS. 5a and 5b are fragmentary enlarged perspective representations of the screw dispensing escapement mechanism of FIG. 1.
Figure 5B:
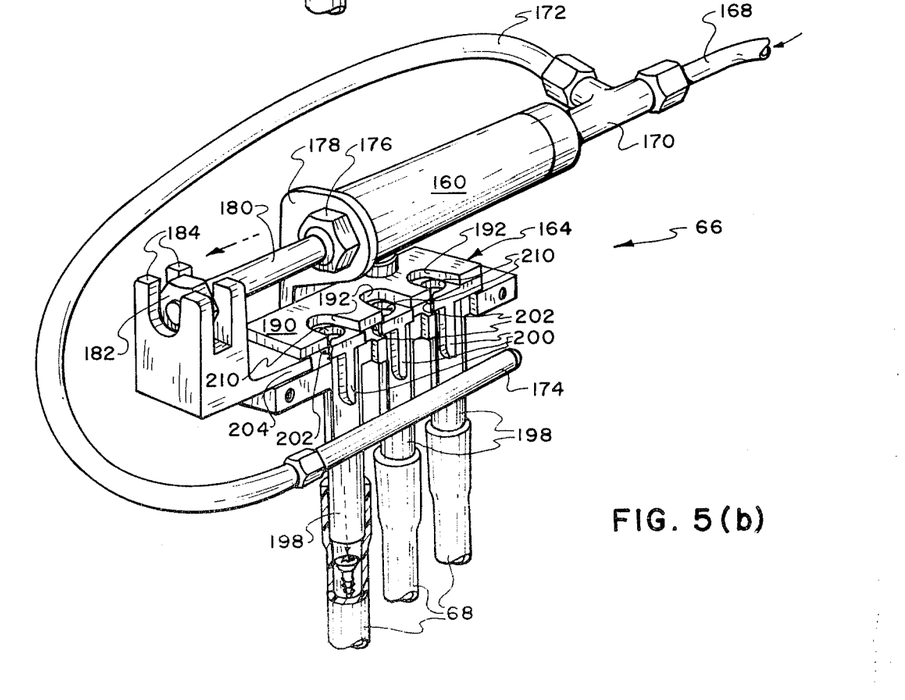

As best seen in FIGS. 2–4, the vibrating screw dispenser mechanism 64 is mounted to the central support 30 upon an I-beam 80, which is supported by a side gusset plate 82. The bottom of the I-beam 80 is suitably secured to the top of the support 30 as by welding or bolts while the top of the I-beam 80 and the top of the gusset plate 82 are integrally secured to a plate 84. The left edge of the gusset as viewed in FIG. 3 is welded to the web of the I-beam 80. Pedestals 86 at the top of the plate 84 receive legs 88 of a pedestal 90, which in turn carries a top plate 92 from which eccentric anchor lugs 94 integrally project. A diagonal brace 96 is connected to each eccentric anchor 94 and held in position by a washer 98 and an Allen-head screw 100. Similar Allen-head screws 102 and washers 104 connect the top portion of each diagonal brace 96 to an eccentric anchor 106 integrally depending from a top plate 108. A cylindrical metal skin 110 conceals the components which are interposed between the plates 92 and 108.

A vibrator 112 is bolt secured at 114 to the top plate 108 and comprises a housing 116 the interior of which comprises a cylindrically hollow center in which a ball is located. The ends of the cylinder are plugged at 118. Air is introduced into the vibrator and across the ball at conduit 120 and fitting 122, causing the ball and the housing 116 to vibrate at a relatively high frequency. Exhaust fluid escapes from the hollow through fitting 124 and conduit 126. A conventional air pressure system is all that is required to allow the vibrator 112 to function.

A vibrator bowl 130 comprises a reservoir for bulk storage of screws and comprises a bottom 132, which is secured to the top plate 108 by an Allen-head screw 134. The Allen-head screw 134 may be tightened somewhat or loosened somewhat to vary the amplitude of the bowl vibration for optimum screw feeding capability. The bottom 132 merges into a 450° ramp 136. At about the 90° point, a deflection plate 138 is secured so as to force screws walking up the ramp 136 as a result of the vibrations to be deflected so as to provide from the 90° point forward the optimum number of screws needed to service the machine 20. As can be seen from FIG. 3, the ramp 136 comprises three tiers elevating the screws to the vicinity of an escapement mechanism 66, where dividers 152 separate the influent screws into three groups.

The operation of the vibrator bowl 130 and the condition of screws on the ramp 136 and in the escapement mechanism 66 may be observed by the user of the machine by visually glancing at mirror 154 (FIGS. 1 and 2) from time to time. Mirror 154 is carried by a conventional casing 156 and is held by an angular support arm 158, which is mounted to the lower plate 192 (not shown).

The escapement mechanism 66, as best seen in FIGS. 3–5b comprises three magazines comprising slots 160 interposed between plate members 162, the plate members being secured at the elevated effluent end of the ramp 136, the dividers 152 causing the screws to fall, threaded end first, into the respective slots, the slots being tapered on each side near the top of the plate portions 162 and spaced such that the head of each screw is received in the tapered portion but unable to pass through the slot. Accordingly, the screws hang by force of gravity in the illustrated positions comprising three magazines. The leading screw in each magazine is introduced into the escapement 164 in a manner more fully hereinafter described. The escapement 164 comprises a pneumatic cylinder 166 by which air under pressure is introduced through tubing 168 and fitting 170. Air is exhausted through hose 172 and effluent fitting 174. The cylinder 166 has a load position shown in FIG. 5a and a discharge position shown in FIG. 5b. The cylinder 166 is mounted by nut 176 to a bracket 178 such that the piston rod 180 extends beyond the nut 176 a considerable distance. The distal end of the piston rod 180 is threaded and receives in threaded engagement another nut 182. Nut 182 is located within a bifurcation 184 of an upstanding arm 186. The arm 186 merges at its lower inside edge with an actuation plate 188. The plate 188, under force of the cylinder 166 slides between the two positions illustrated in FIGS. 5a and 5b. The actuation plate 188 is flanked at the top by a plate 190 having U-shaped recesses 192 and by a base plate 194, also having U recesses 196. The lower plate 194 is suitably secured to the distal end of the plates 162 which in turn are held in fixed position by the bowl. Each recess 196 receives and holds in secured relation a discharge tube 198 along which a single screw is dropped by force of gravity as hereinafter more fully explained. The actuation plate 188 comprises three spaced key hole shaped slots 202. Each slot opens an edge 204 of the actuation plate 188, the initial part of the key hole shaped slot comprising opening and the distance of which is smaller than the head of the screw used in conjunction with machine 20. The nethal portion of the slot enlarges in each case to a larger dimension greater than the size of the head of the screw. Thus, when the magazines have by vibration delivered three screws into the slots 202 with the cylinder 166 and actuation plate 188 in the "at rest" position of FIG. 5a, the screws are held by the plate 188 against deposition in the tube 198. When the cyclinder 166 moves the actuation plate 188 to the position of FIG. 5b, the screw head is instantaneously immediately above the enlarged portion 210 of the associated key hole slot 202. Thus, the three screws fall into and through the three discharge tubes 198 and the plastic flexible screw delivery tubes 68. The actuation plate 188 comprises a series of depending stop fingers 200. These fingers are interposed between the three magazines and the three screw sites in the escapement 164 in the screw release, open position of FIG. 5b so that only one screw is discharged into each tube upon actuation of the cylinder 166.

It is to be appreciated that the vibrating screw dispenser mechanism 64 is a commercially available unit and that other known or commercially available units for segregating screws into a plurality of groups and for discharging the requisite number of screws per set to the hinge-holding, screw-placing head 70 may be used. As one example, TRU-TORK screw feeding systems, available from Clyde Corporation of 1800 West Maple Road, Tacey, Michigan 84084 are suitable.

The mechanisms including stationary frame 76 and reciprocating frame 72 for displacing the screw placing head 70 up and down will now be described in detail with particular reference to FIG. 6. The fixed frame 76 may be formed as a single casting or may be assembled as a plurality of components. As illustrated fixed frame 76 comprises a top plate 220 apertured to receive in bolt-secured relations the anchor plate 222 of a double acting air cylinder 224 which is serviced by conduits 226 and 228. The piston rod 230 extends through and is movable in respect to the plate 220 and also passes loosely through the central aperture 232 of top plate 220. Vertically aligned lug sets 234 and 236 anchor upper and lower ends of cylindrical posts 238 each of which is surrounded by a return spring 240. Set screws or the like (not shown) hold the posts 238 within the vertical bores of the lugs 234 and 236. The frame 76 comprises upper and lower beams 242 and 244 as well as columns 246 and 248. A bracket 250 integrally depends from the beam 244 and terminates in a horizontally extending leg 252. The side edges of the vertical portion of bracket 250 comprises grooves 254, used to secure the fixed frame 76 in the assembled illustrated position in a manner hereinafter explained. As best shown in FIGS. 1 and 2 the fixed frame 76 is mounted to the front face of the support 30 using anchor plates 255. Anchor plates 255 comprise a tongue portion adapted to mate firmly with one groove 254 of the bracket 250. By securing each plate 255 to the face of the support 30 using cap screws or the like, the tongue and groove union at 254 on each side supports the fixed frame 76 in rigid orientation as shown in the Figures. The horizontal leg 252 includes three apertures 256 through which the screw driver mechanism 74 pass. A plurality of holes 258 accommodate bolt fastening of the screw placement mechanism 70 to the horizontal leg 252 of the bracket 250.

The reciprocating bracket 72 comprises an upper platform 270, a lower platform 272 and a pair of forward columns 274, the top and bottom plates 270 and 272 being cantilever supported by the columns. The top plate 270 comprises three apertures 276, the lower mounting plate 278 of one of three fluid motors 280 being secured to the plate vertically above the associated aperture 276 so that the output drive shaft 283 of the motor extends through and rotates free of the associated aperture 276. The distal end of the piston rod 230 extends through an aperture 280 in the plate 270 and is secured thereto by nuts or the like so that retraction and extension of the piston rod 230 elevates and lowers the reciprocating frame 72, respectively. Vertical reciprocation is insured by upper and lower aligned bushings 282 and 284 press fit into suitable openings in the top and bottom flanges 270 and 272 through which the previously mentioned vertical posts 238 pass permitting relative sliding motion of the reciprocating frame 72 along the post 238 in respect to the fixed frame 76. In the absence of force exerted by cylinder 224 the pair of springs 240 return the reciprocating frame 72 to its elevated position.

The lower plate 272 comprises three apertures 280 through which the driver mechanisms respectfully pass to the head 70, the spacing and location of the apertures 286 being selected to correspond to the particular hinge apertures through which screws will be driven into the work by head 70. Naturally, the screw locations may be varied from embodiment to embodiment to suit the hinge needs of a particular application.

Figure 6:
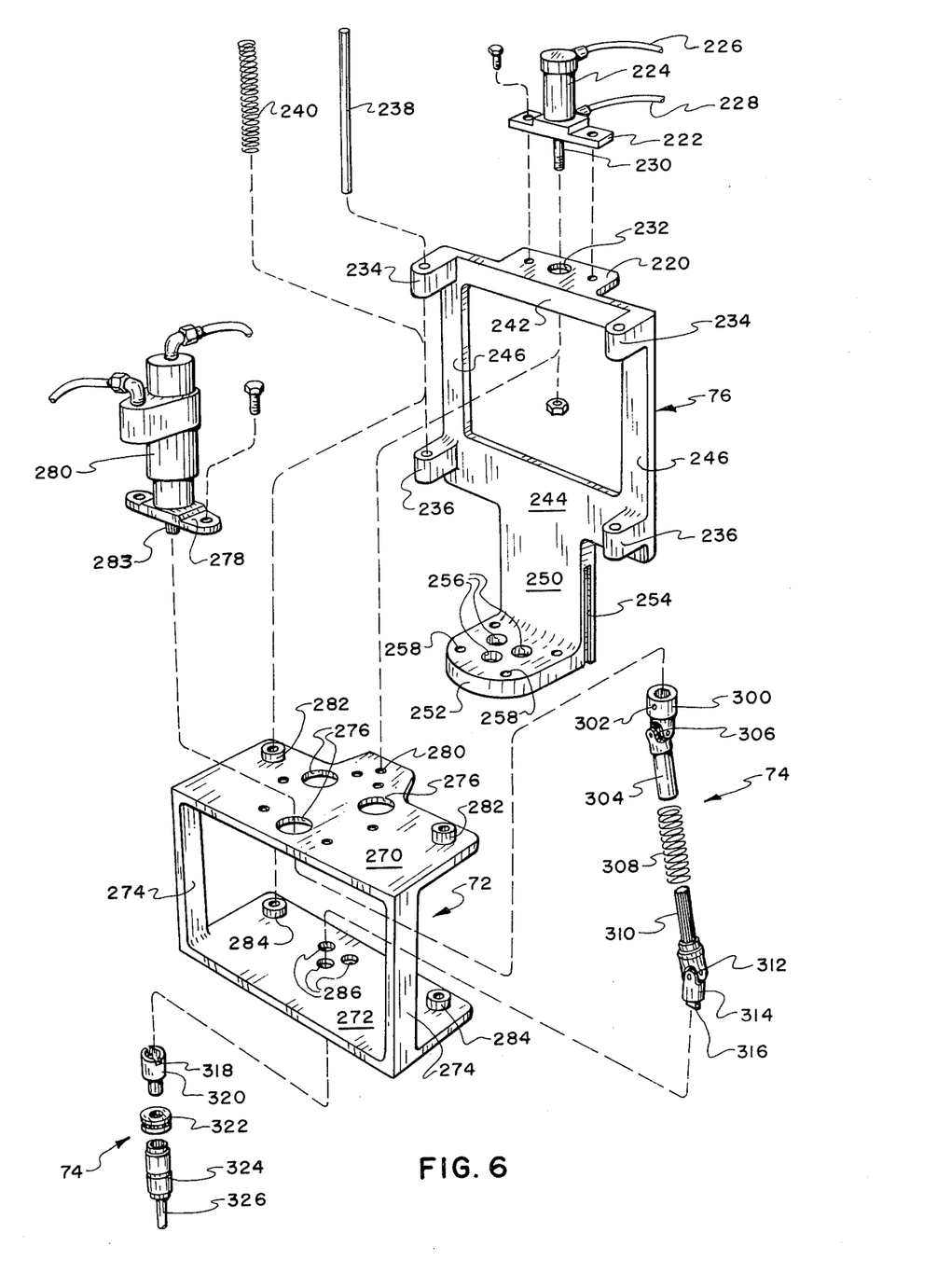
FIG. 6 is an enlarged fragmentary exploded perspective of the fixed and reciprocating frames, one universal joint screw driving mechanism, a double acting pneumatic cylinder and a fluid motor whereby the head is lowered to the work and the screws are rotated into the work through hinge apertures.
Figures 7, 8A:
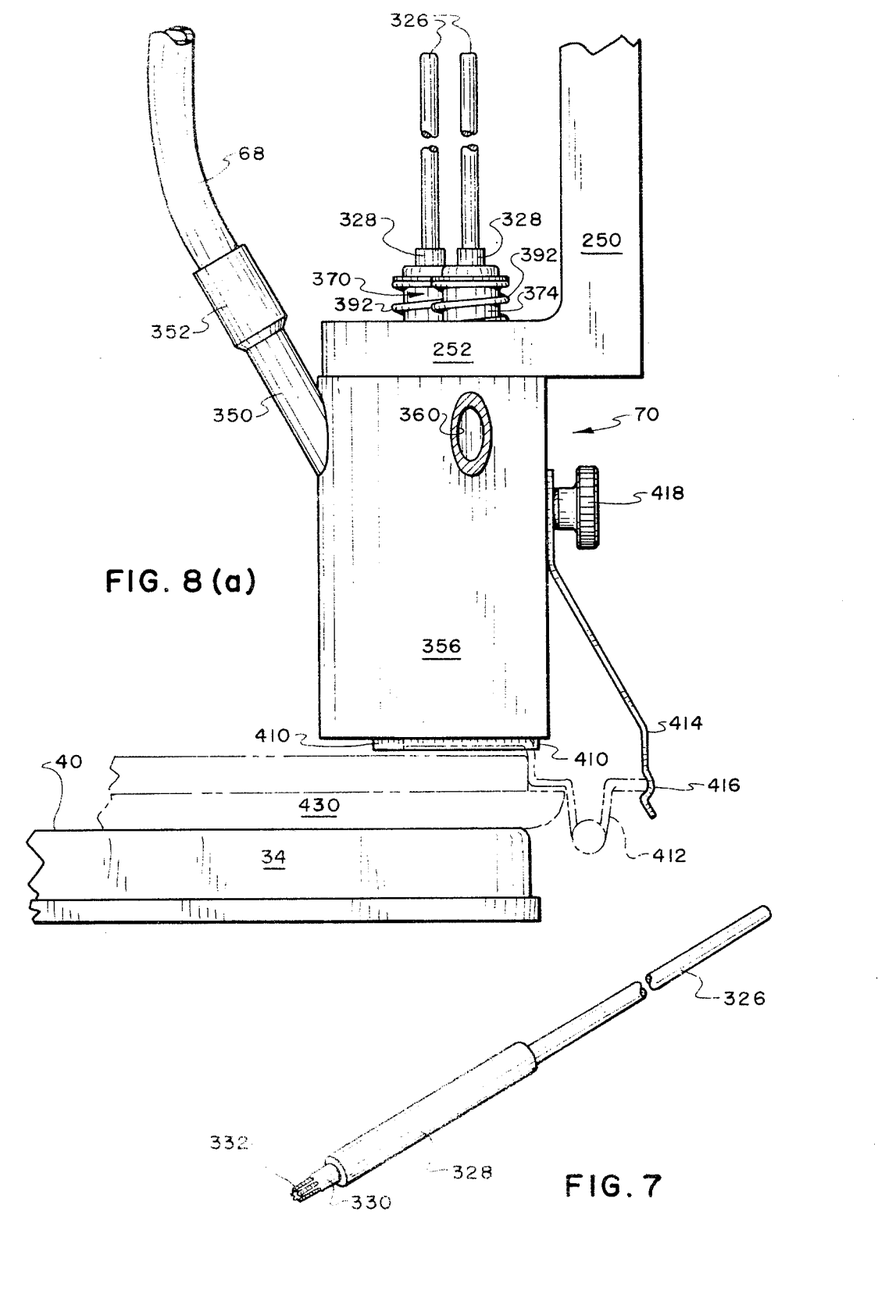
FIG. 7 is a perspective representation of the driver end of one of the screw driver mechanisms.
FIG. 8a is an enlarged fragmentary side elevation of the screw placing head shown in its lowered position against a door workpiece with a hinge held by the head contiguous with the door.

With continued reference to FIG. 6, each driver mechanism 74 comprises a female coupling 300 adapted to receive a male spline drive shaft 283 of the adjacent motor 280 and held in position by a set screw 302 or the like. A central, spring loaded shaft 304 is joined by universal joint 306 to a female coupling 300. A compressed spring 308 yokes the shaft 304 to a lower shaft 310 in such a way that exact alignment between the shafts is not necessary for adequate rotation. The lower shaft 310 is joined at universal connection 312 to a female coupling 314, the male blade 316 of which fits into a female slot 318 of a coupling 320. Coupling 320 fits within a bearing 322, accommodating rotation across the plate 272. A fitting 220 is non-rotatably coupled to a coupling 324, from which a driver shaft 326 non-rotatably depends. Driver shaft 326 is also shown in FIG. 7 where it is non-rotatably coupled by sleeve 328 to a driver head 330 having a male end 332 adapted to mate with the female end of the screws to be placed in the work through a hinge. The above-described screw driver mechanisms function to rotate as drive shaft when the respective motors 280 are on and, upon lowering by the double acting cylinder 224 of the reciprocating frame 72, each driver head 330 at male end 332 will engage and rotate a screw causing it to be advanced from the head 70 into the work through an aperture in the hinge as more fully hereinafter described.

Figure 8B:
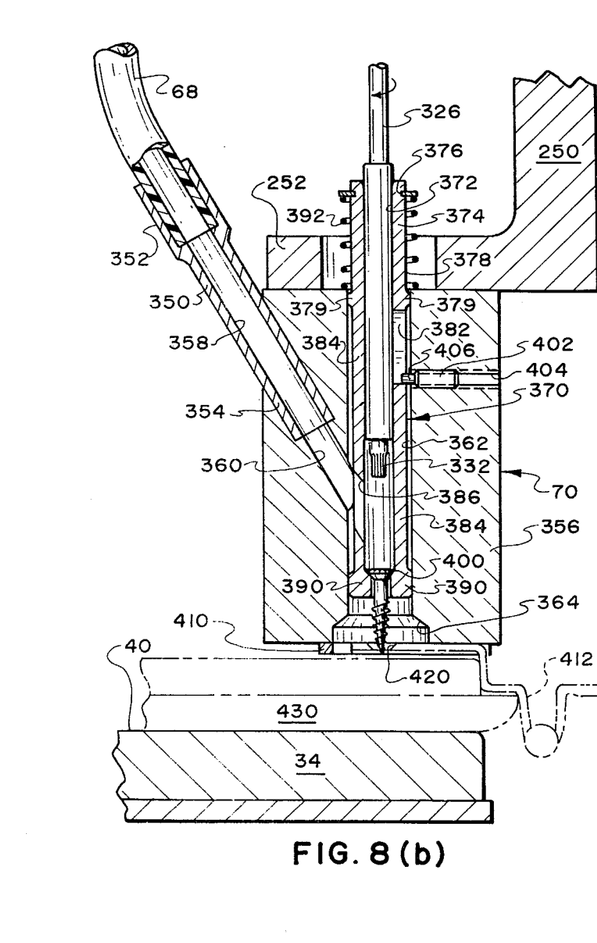
FIGS. 8b and 8c are cross-sectional views similar to FIG. 8a illustrating the location of one screw within a collet of the head prior to engagement of the screw by the associated driver mechanism and the actual engagement of the screw and placement of the screw in the work through an aperture in the hinge, respectively.
Figure 8C:
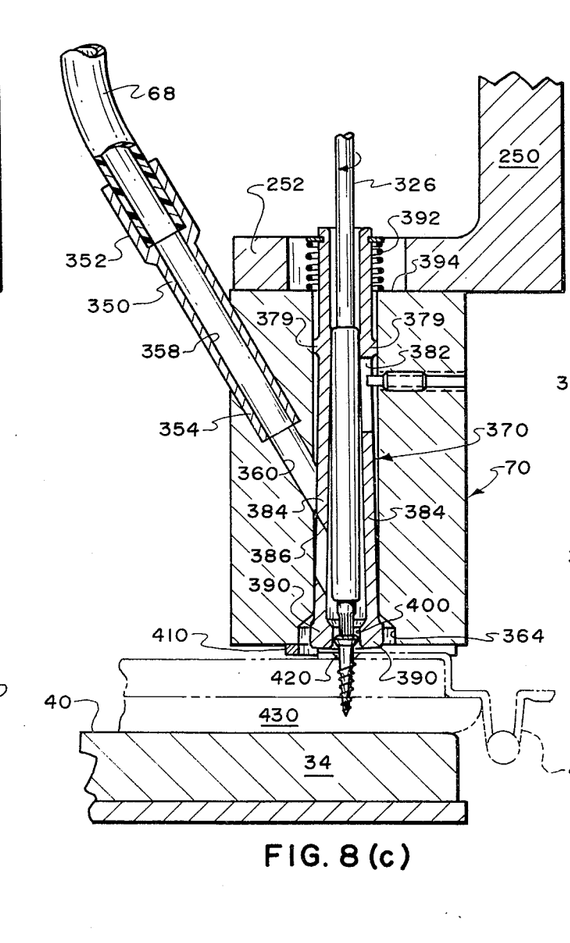

For the purpose of describing the hinge-holding, screw-placing head 70, reference is now made to FIGS. 8a, 8b and 8c. It is to be appreciated that head 70 comprises three separate screw-receiving and screw-dispensing stations. Since each station is substantially identical to the next, only one will be described.

Figure 9:
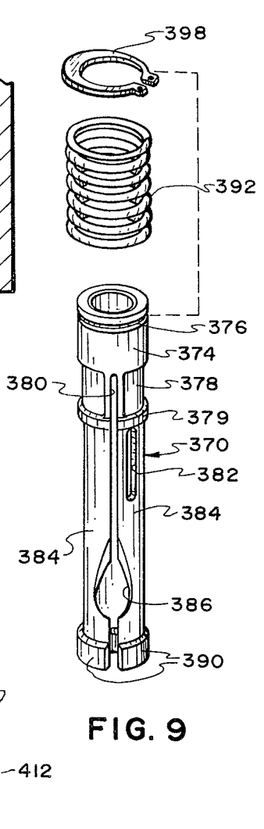
FIG. 9 is an exploded enlarged perspective representation of one of the three collets contained within the screw-placing head.
Figures 10A, 10B:
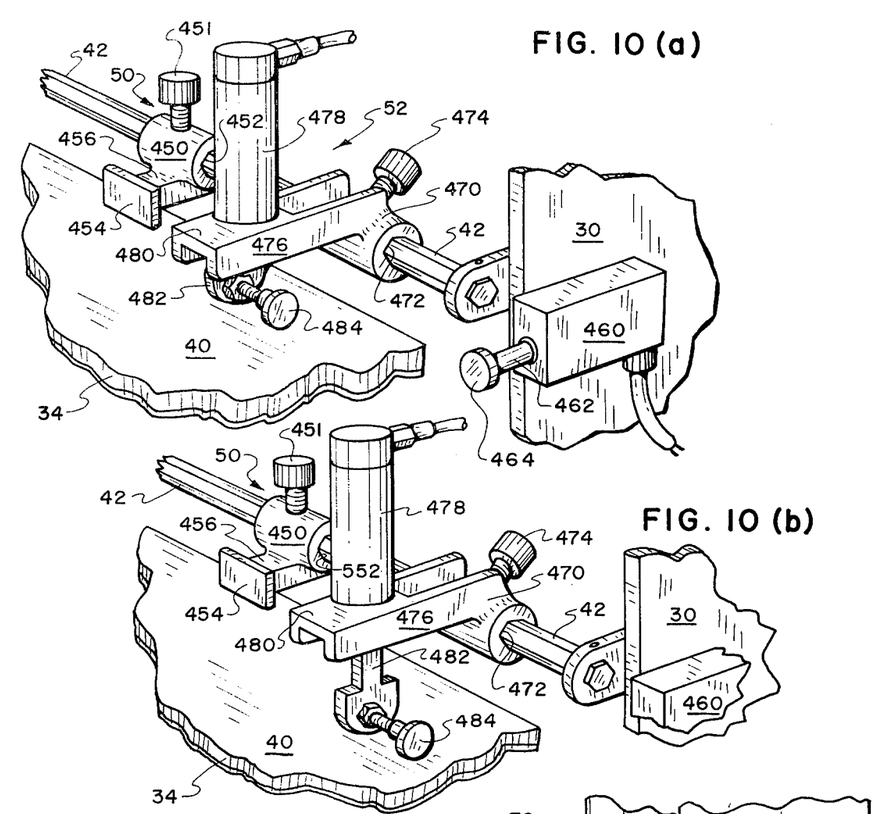
FIGS. 10a and 10b are fragmentary enlarged perspective representations of stop structure for correctly orienting the workpiece on a machine table top shown respectively in down and up conditions.

Each screw site of the head 70 comprises a receiving tube 350 having a barrel female end 352 into which one of the tubes 68 is press-fit. The lower end 354 of each tube is anchored to the head housing 356 with the interior 358 of each receiving tube 350 alignedly communicating with a diagonal passage 360 in the housing 356. The diagonal passage 360 intersects a vertical, centrally located cylindrical bore 362 in the head at a location below the midpoint. Each vertical bore 362 terminates in an enlarged counterbore 364 at the bottom of the housing 356. Each vertical bore 362 slidably receives in snug relation a collet 370. The coupling sleeve 328 of the associated driver mechanism fits slidably and rotatably, but snugly within the central bore 372 of the associated collet 370. As best illustrated in FIG. 9, the collet comprises a hollow cylindrical member comprising a top cylindrical section 374 containing a snap ring groove 376. A reduced diameter portion 378 merges with the top portion 374 and has a diameter slightly less than the diameter of section 374. The central portion 378 comprises the beginning of three slots 380 which extend downward through the remaining length of the collet 370. A bearing guide 379 is adjacent portion 378. A set screw slot 382 also exists in one of the three downwardly extending fingers 384 formed by the slots 380. The fingers in question are resilient, although preferably of metal and are pre-biased to spring outwardly when unrestrained. Thus, when unrestrained, each slot becomes progressively larger in a downward direction. Each slot 380 is interrupted by a tier shaped opening 386 which, in the assembled position, is aligned with the associated diagonal passage 360 of the housing 356 to periodically receive gravity dispenser screws emerging from the associated tube 68. The lower end of each finger 384 comprises a bearing guide 390. A return spring 392, in the assembled condition bears against the top surface 394 of the head 356 and also against the exposed snap ring 398, which is fitted in the groove 376 as illustrated in the Figures. Thus, in the absence of countervaling force, the spring 392 will elevate its associated collet 370 to the position of 8a and 8b.

Each collet also has an interior reduced diameter shoulder 400, the diameter of which is less than the diameter of the screw head when the collet 370 is in the elevated position of FIG. 8b. Thus, when a screw is received by gravity through the tube 68, the hollow interior 358 of the receiving tube 350, the passage 360 and the tier drop opening 386, it will fall thread first into the position of FIG. 8b being retained in that position by engagement of the screw head with the reduced diameter neck 400. As can be seen from FIG. 8b, the set screw 402 placed in threaded bore 404 of the housing 356 has a projecting male extension 406, which fits within the slot 382 to restrict the upward and the downward motion of the collet respecting the housing 356.

Normally, a hinge locator or nest 410 (FIG. 8a) receives one or more edges of a hinge 412 such that the hinge is held to the nest 410 in a ready to be assembled condition by the lateral force of a contoured leaf spring 414, which engages one side of the hinge at location 416 and is mounted by a thumb screw 418 to the head 356 at a tapped and threaded bore (not shown). The nest 410 and the hinge are constructed so that one aperture 420 (FIGS. 8b and 8c) is vertically aligned with each collet held screw.

Rotation and lowering of the driver mechanisms will bring each driver head 332 into non-rotatable engagement with the female slots of the associated screw head, initially causing the screw to rotate. Continued downward displacement of the screw driver mechanisms will cause the associated collets 370 to follow the drivers in a downward direction counter to the bias of the springs 392. Naturally, the three screws continue to rotate and are advanced through apertures 420 in the hinge 412, bite into and are displaced into the wood. When the lower bearing guides 390 of the vertically depending fingers 384 of each collet 370 are downwardly displaced until juxtaposed the counterbore 364, the fingers 384 will spread allowing the screws to move downward relative to the collet and emerge from the collet as best seen in FIG. 8c. The finger 384 most near the passage 360 blocks the passage when the collet is in the down position making it impossible for an additional screw to be received in the collet or to jam the machanisms at the collet. Thus, when the screw drivers have completed their rotation, the screws will be fully inserted and will be disposed exterior of the collets. At this point rotation of the screw driving mechanism is terminated and the head returned to its elevated position preparatory to another hinge-holding screw-placing cycle. The return springs 392 elevate the three collets 370 to a height permitted by set screws 402, this position being shown in FIG. 8b.

Figure 11:
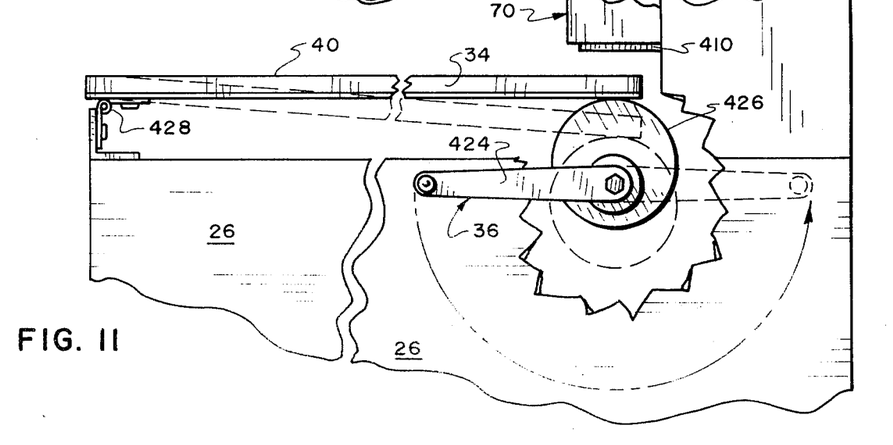

The correct position for receiving a hinge in screws for the work 430 is illustrated in FIGS. 8a, 8b and 8c. This position is best accomplished by rotating the crank mechanism 36 thereby displacing the handle 424 and the non-rotatable cam 426 which is non-rotatably secured to the handle 424 from the solid to the dotted line position of FIG. 11. The work is then easily placed on the table and inserted beneath the head 70. When the edge and ends of the work, usually a door, are correctly oriented as hereinafter set forth, the crank 424 and cam 426 are returned to the solid line position of FIG. 11. The continuous hinge 428, interposed between the frame 22 of the machine 20 and the cable 40 permits the indicated rotation at the front lip of the table, the back end of the table resting on the cam 426 by force of gravity.

The previously mentioned edge stops 50, mounted on each bar 42 are slidably disposed along a boss 450. The boss comprises a hexagonal bore 452 which mates with the cross-sectional configuration of the bar 42. Boss 450 also has a set screw 451 for holding the stop 50 in a desired location. An abutment surface 450 projects toward the front of the table and extends a short distance across and slightly above the table so as to be engaged by the work. The abutment 454 is anchored to the projection 456 which is integral with the boss 450. A safety switch 460 is mounted to the central support 30 and has a switch actuating plunger 462, which when depressed turns the machine 20 on and serves also as an edge stop so that when the edge of the work along which a hinge is to be placed is against one abutment 454 and the abutment 464 of the plunger 460, the edge will be in proper alignment with the head 70.

Each end stop mechanism 52 comprises a support including a boss 470 having a central hexagonal bore 472 mating with and slidably related to the hexagonal rod 42, with a set screw 474 for critically holding the stop 52 in a selected position. The button switches 38 are located forward of the mechanisms 50 and 52 and project a short distance above the surface 40 of the table 34 such that when the work is displaced along the surface 40 of the table 34 and across the right button switch 38, the right stop mechanism 52 is caused to be elevated and the stop of the left mechanism 52 is lowered. In like manner, the left button switch elevates the stop of the left mechanism 52 and lowers the stop of the right mechanism 52. A bracket 476 projects forward from the boss 470 and holds a pneumatic cylinder 478 in a vertical position at cross plate 480. The piston rod 482 extends freely through the plate 480 for extending and retracting the edge stop abutment 484, which is integrally secured to the piston 482. The two stops 484 of the machine are oppositely directed and it is preferred that only one be actuated at a time. Commonly, when a cabinet door comprises the work, two hinges will be placed along one edge of the cabinet door. The stop structures 50 and 52 are placed along the two rods 42 and secured in their placed positions to accommodate placing two hinges with a single head 70 through two cycles of the machine first actuating one end stop mechanism and then the other. When the left stop mechanism 52 is down and the right stop mechanism 52 up, the left end of the work will engage the left stop 484 and the back edge of the work will engage the depressed stop 464 of switch 460 and the stop 454 of the right mechanism 50. In this condition, one hinge is screw secured to the door in the previously described fashion. Thereafter, the left end stop mechanism 52 is elevated and the right end stop mechanism 52 lowered such that the right end of the work engages the right stop 484 and the back edge of the work engages the left stop 454 and the depressed plunger 464 following which the second hinge is automatically screw secured to the door.

Figure 12:
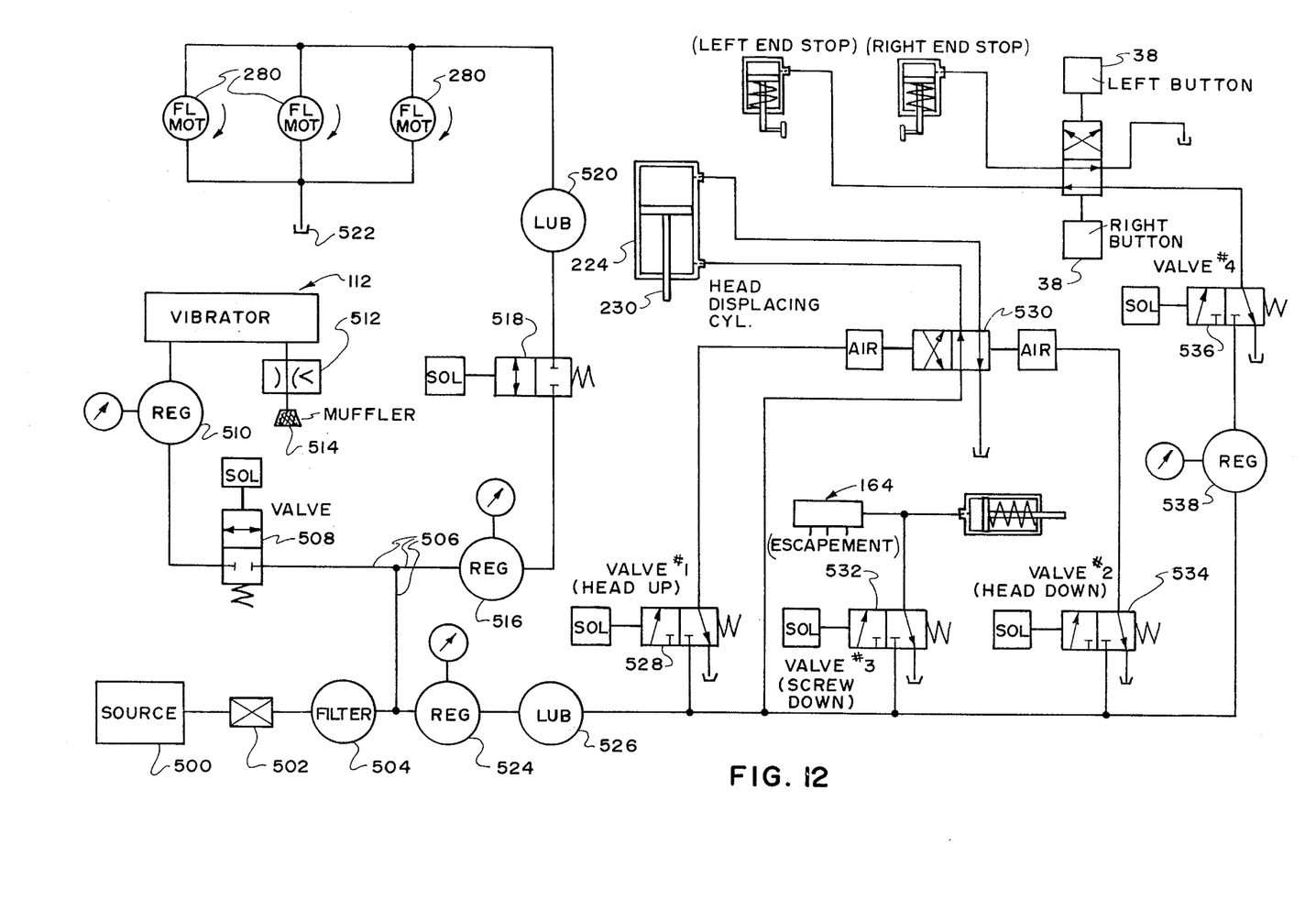
FIG. 12 is a schematic representation of the presently preferred pneumatics for the apparatus of FIG. 1.

Specific reference is now made to FIG. 12 which comprises a diagrammatic representation of the pneumatic system associated with the machine 20. A source of pressure 500 preferably on the order of 80 to 130 PSI, depending upon the type of wood or material comprising the workpiece. The air under pressure is controlled by a master valve 502 and is filtered at 504 to remove impurities. Incidentally, it is preferred that the conduit channeling air under pressure throughout the pneumatic system of FIG. 12 be conventional plastic tubing with conventional metal fittings. The air at source pressure is delivered by conduit 506 to a solenoid valve 508, which is designed to be always on when the master power switch is on. Thus, the pressure is regulated across regulator 510 and delivered to the vibrator 112 following which the air is exhausted to the cross flow control 512 and through a muffler 514 to atmosphere. Thus, vibrator 112 is always vibrating when the system is on. Pressure available at conduit 506 is delivered across regulator 516 to a solenoid valve 518 which, when actuated, causes the fluid motors 280 to rotate the screw driver mechanisms as henceforth explained. The air influent to the fluid motors is lubricated at 520 and is exhausted to a suitable corructor 522. Source air crosses pressure reducing regulator 524 and is lubricated at 526. Pressure emanating from the lubricator 526 is passed to solenoid valve 528, pressure operated spool valve 530, the solenoid valve 532, solenoid valve 534 and solenoid valve 536 (across regulator 538). When actuated solenoid valve 528 delivers air under pressure to the left side of pressure operated valve 530, shutting the valve for air flow thereacross to the lower side of two way pneumatic cylinder 222 causing the head 70 and reciprocating frame 72 to elevate. Whenever solenoid valve 528 is actuated, solenoid valve 534 is inactive and vice versa. When solenoid valve 534 is actuated, air emanating from lubricator 526 is delivered to the right side of pressure operated valve 530 causing air to pass from the valve to the upper portion of the cylinder 224 lowering the head 70 together with the reciprocating frame 72.

When activated, solenoid valve 532 actuates escapment 164 causing three screws to drop into tubes 68 and the gravity displaced into ready positions within the respective three collets of the head 70.

Actuation of solenoid valve 536 places the two (left and right) button switches 38 in a state of readiness such that depression of the left button causes the right end stop 52 to be lowered and the left end stop to be elevated and actuation of the right button switch 38 causes the opposite to occur. It is to be appreciated that the various pressure regulators mentioned are adjustable and are set for optimum operation by the user as circumstances may require from time to time.

Figure 13:
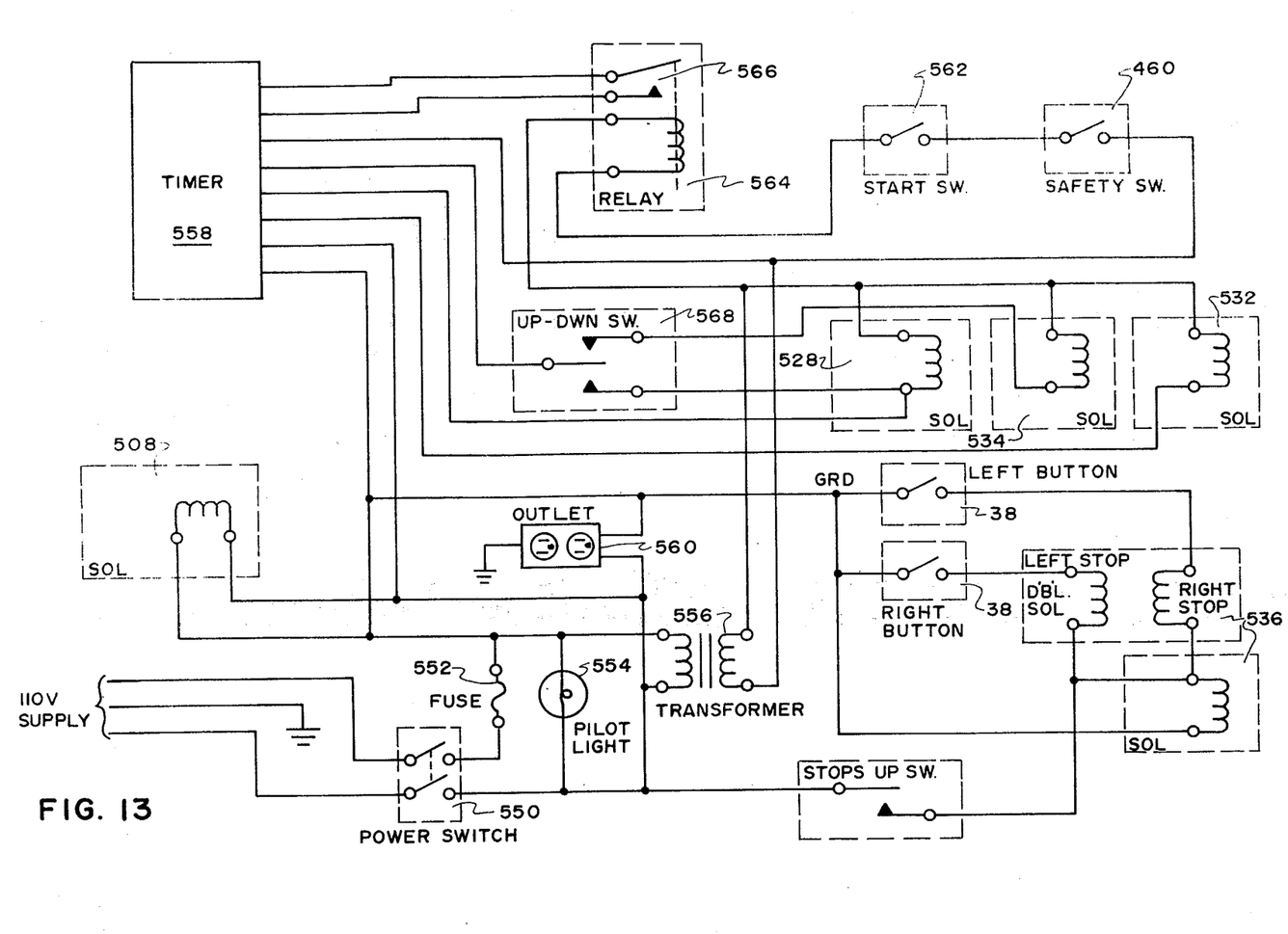
FIG. 13 is a diagram of the presently preferred electric circuit for the apparatus of FIG. 1.

A reference is now made to FIG. 13 which illustrates a presently preferred electrical schematic for operating the machine 20 heretofore described. A 110 volt AC electrical source is made available to the master switch 550 and, when closed, by the operator a fuse 552 prevents overload damage and a pilot light 554 is illuminated indicating to the operator the availability of power to the machine 20. At the same time, the transformer 556 is energized delivering 24 volts across its secondary coil. The solenoid of solenoid valve 508 is energized causing the vibrator 112 to operate. The source power is also communicated to the timer 558.

Electrical power is made available for auxiliary purposes at outlet 560.

The 24 volt power is delivered to a starter switch 562 and when safety switch 460 is actuated the 24 volt source energizes relay 564 closing the switch 566 of the relay permitting operation of the system.

When the operator actuates the two-way switch 568 into the top position, the coil of solenoid 534 is energized causing the cylinder 224 to lower head 70. When switch 568 is positioned in its lower position, solenoid 528 is energized causing the head and cylinder 224 to be oppositely positioned. A feedback signal to the timer from solenoid 528 causes the timer to energize solenoid 532 causing a set of screws to be dropped at the appropriate time.

Closing by the operator of the stops up switch supplies power to the solenoid mechanism of valve 556 and, upon closing of the left button switch 38, the right solenoid is energized dropping the stop of the right stop structure 52 and holding the stop structure of the left stop mechanism 52 in the elevated position. Accordingly, when the right button switch 38 is actuated, the left solenoid is energized causing the stop structure of the left mechanism 52 to lower and stop structure of the right mechanism 52 to be in an elevated position for securing by screws a hinge to the workpiece as heretofore described.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. An automatic screw insertion machine comprising:
means for storing, delivering and inserting screws into a workpiece adjacent one edge thereof;
a table upon which the workpiece is placed to receive said screws, one edge portion of the table being generally below the first-mentioned means;
means for relatively lowering and elevating said table edge to facilitate placement of said workpiece edge directly beneath said first-mentioned means;
first stop means physically locating said workpiece edge exactly along a predetermined line on said table;
second stop means physically locating the ends of said workpiece in a predetermined position on said table in respect to said first-mentioned means.

2. In an apparatus for inserting a screw into a workpiece comprising:
means for inserting screws into the workpiece;
a table upon which the workpiece is placed;
a plurality of edge stop abutments, at least one said edge stop abutment comprising a master switch enabling the apparatus, when actuated by engagement with one edge of the workpiece upon the table, said edge stop abutments serving to engage and precisely orient said workpiece edge along a pre-defined line on the table;
a plurality of selectively operable end stop abutments, the end stop abutments serving to selectively engage and precisely orient respective ends of the workpiece on the table;

means for relatively displacing each end stop abutment between interfering and non-interfering locations respecting the workpiece;

whereby the workpiece is precisely three dimensionally located on the table.

3. The apparatus of claim 2 wherein the screw inserting means comprise:

a head simultaneously holding at least one screw for insertion into the workpiece;

driver means advancing and rotating the screw into the workpiece; and further comprising:

means relatively displacing the head to a position adjacent the workpiece; the screw inserting means further comprising:

power means causing the driver means to advance and rotate;

control means enabling the power means only when the head is adjacent the workpiece.

4. The apparatus of claim 2 wherein said end stop abutments comprise two, wherein said displacing means oppositely simultaneously displace said two end stop abutments and further comprising two switches exposed at the surface of the table spaced such that one or the other but not both is actuated by the work piece upon the table to elevate one and lower the other end stop abutment whereby the work piece can be accurately placed in either or both, sequentially, of two predetermined positions to receive screws.

5. In an automatic screw insertion machine:

a frame;

a waist level table supported by the frame;

a plurality of horizontally oriented rods carried by the frame;

a plurality of workpiece edge and end stop abutments slidably disposed upon at least one of said rods;

means for locking each stop abutment in a selected position along said at least one rod;

at least one mechanism, comprising a screw storage reservoir, screw feeding means, screw holding means and screw driving means movably mounted upon one or more of said rods for simultaneously inserting sets of screws into a workpiece;

means for locking said at least one mechanism in a selected position along said one or more rods.

6. An automatic machine for simultaneously placing a plurality of screws into the body of a workpiece comprising:

a screw delivery mechanism comprising:

a. means for storing, in bulk, a supply of screws;

b. means for segregating screws, received from storage, into at least one set;

c. means orienting said segregated screws in a head up/threads down condition;

d. means releasing said at least one set of segregated and oriented screws from time to time into at least one chute;

a screw holding mechanism for receiving said set of screws from said at least one chute and releasably holding the screws of said set in a vertically erect condition;

a screw driving mechanism comprising screw drivers equal in number to the number of screws in said set and power means for simultaneously rotating and advancing the screw drivers whereby the screws are engaged and advanced into the workpiece and free of the screw holding mechanism.

7. A screw insertion machine comprising: means receiving a workpiece;

a screw placement mechanism comprising:

a. at least one screw receiving body;

b. a plurality of screw holding means carried by the body each defining a screw holding site;

c. screw drivers, each reciprocably and rotatably disposed in respect to each screw holding means above the associated screw holding site;

d. power means for selectively and simultaneously advancing and rotating all of said screw drivers to simultaneously engage, rotate and advance the screws into the workpiece;

a relatively reciprocable carriage carrying the screw placement mechanism; and power means for relatively displacing the screw placement mechanism between positions remote from and juxtaposed the workpiece.

8. The machine of claim 7 comprising driver site defining means contiguous with all screw drivers establishing an array for the drivers in exact alignment with the screw holding sites, whereby the number and nature of the array may be varied by correspondingly varying the driver site defining means and the screw holding means.

9. The machine of claim 7 further comprising means for releasably holding a hinge, having aperture sites corresponding in number and location to the screw holding sites, the hinge being disposed between the work piece and the body whereby insertion of the screws affixes the hinge to the work piece.

10. An automatic screw placement apparatus comprising:

at least one screw receiving body having a plurality of screw retaining sites;

retention means at each site for releasably retaining a body received screw oriented for insertion into a work piece, each said retention means comprising means releasing the screw from retention as the screw is being inserted into the work piece;

means interposed between the retention means and the work piece for releasably retaining a hinge having an array of apertures corresponding to and aligned with said sites;

power driven screw driver means at each site cooperating with the associated retention means, said screw driver means comprising a male driving end whereby all retained screws are simultaneously engaged, rotated and advanced by the screw driver means through apertures in the hinge into the work piece to affix the hinge to the work piece.

11. The screw placement apparatus of claim 10 wherein said screw receiving body comprises a plurality of chutes along which sets of screws pass by force of gravity to said sites and said retention means each comprise a collet disposed in a bore in said body, each collet having a lateral opening through which screws are received from an associated one of said chutes.

12. The automatic screw placement apparatus of claim 10 wherein said retention means each comprise a collet slidably mounted for reciprocation within a bore of the body and biased toward an inactive position, each said body bore being dimensionally enlarged at the lower end, each collet comprising a lateral screw receiving port, downwardly projecting slidably resilient fingers together defining an axial screw driver receiving passage with a dimensionally reduced lower end opening against which a screw rests in head up/threads down relation after passing through the lateral port, a power driven screw driver slidably disposed in the axial passageway of each collet, which screw drivers are simultaneously advanced to engage, rotate and advance a set of screws held by the collets by displacing the lower opening of each collet adjacent the dimensionally enlarged lower end of the body bores where the resilient fingers of each collet spread under screw driver force applied to the head of each screw and the screws escape the collets when at least partly inserted within the workpiece.

13. The apparatus of claim 12 wherein each said collet comprises guide means adjacent the body bore to insure smooth reciprocation of the associated collet.

14. An automatic screw driver assembly comprising:
a plurality of screw driver shafts, the driving ends of which are adapted to be received in a screw insertion head;
a relatively reciprocable carriage causing the screw driver shafts to be placed adjacent a workpiece;
placement means carried by the carriage, through which each screw driver shaft rotatably passes, defining an array formed by the shafts to correspond to aperture locations in a pre-selected hinge and at least in part aligning the shafts in parallel relation;
motor means carried by the carriage for selectively rotating the shafts;
power transfer means carried by the carriage and spanning between the motor means and each screw driver shaft, each power transfer means comprising at least two universal joints non-rotatably coupled one to the other by a diagonal drive and respectively coupled to the motor means and one shaft for conveying rotation from the motor to the shaft.

* * * * *